Figure 1:
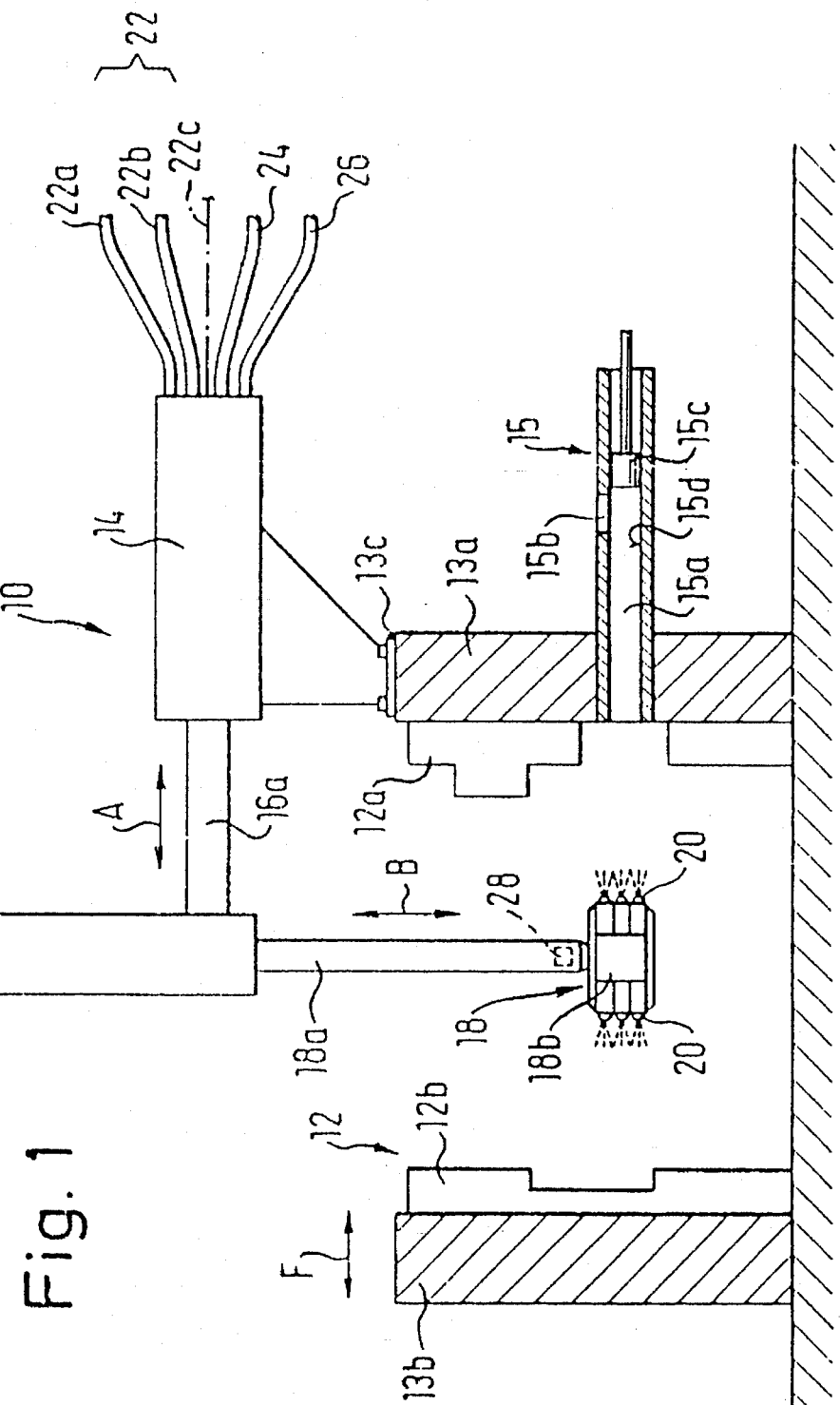

United States Patent [19]
Keim et al.

[11] Patent Number: 5,524,829
[45] Date of Patent: Jun. 11, 1996

[54] SPRAY ELEMENT ESPECIALLY FOR MOLD SPRAYERS

[75] Inventors: Karl-Heinz Keim, Neu-Ulm; Rudi Kober, Süssen; Hans-Dieter Renkl, Berghülen, all of Germany

[73] Assignee: Acheson Industries, Inc., Port Huron, Mich.

[21] Appl. No.: 251,331

[22] Filed: May 31, 1994

[51] Int. Cl.$^6$ .............................. F16K 7/07; B05B 1/30
[52] U.S. Cl. .................... 239/533.15; 239/569; 239/570; 251/5; 251/358; 137/853
[58] Field of Search .................... 239/569, 570, 239/533.15; 251/5, 61.1, 358; 137/853

[56] References Cited

U.S. PATENT DOCUMENTS

| | | | |
|---|---|---|---|
| 2,747,608 | 5/1956 | Grove | 137/853 |
| 3,298,391 | 1/1967 | Savage | 251/5 |
| 3,325,138 | 6/1967 | Connolly | 251/5 |
| 3,445,085 | 5/1969 | Eckel et al. | 251/5 |
| 3,687,365 | 8/1972 | Laessig | 251/5 |
| 5,314,116 | 5/1994 | Krauth et al. | 239/533.13 |

FOREIGN PATENT DOCUMENTS

| | | | |
|---|---|---|---|
| 1675427 | 1/1973 | Germany | 251/5 |
| 0146963 | 9/1982 | Japan | 251/5 |
| 92/04126 | 3/1992 | WIPO | 239/1 |
| 92/20942 | 11/1992 | WIPO | 251/61.1 |

*Primary Examiner*—Karen B. Merritt
*Attorney, Agent, or Firm*—Dinnin & Dunn

[57] ABSTRACT

A spray element for use with a mold sprayer of the type used to spray a mold prior to or between cycles of a manufacturing operation such as die-casting, drop forging or other operations involving the working of metals. The spray element includes a valve body having an internal elastic pretension. The valve body may be positioned in either an open or closed position in relation to a valve seat. A control pressure is applied, through a separate feed line, to the valve body to open and close the valve by forcing the valve body against or away from the valve seat. The spray element also includes a feed line supplying working air which cooperates with an atomizer attached to a feed line supplying a working medium to the atomizer to atomize the working medium when the valve body is actuated.

24 Claims, 12 Drawing Sheets

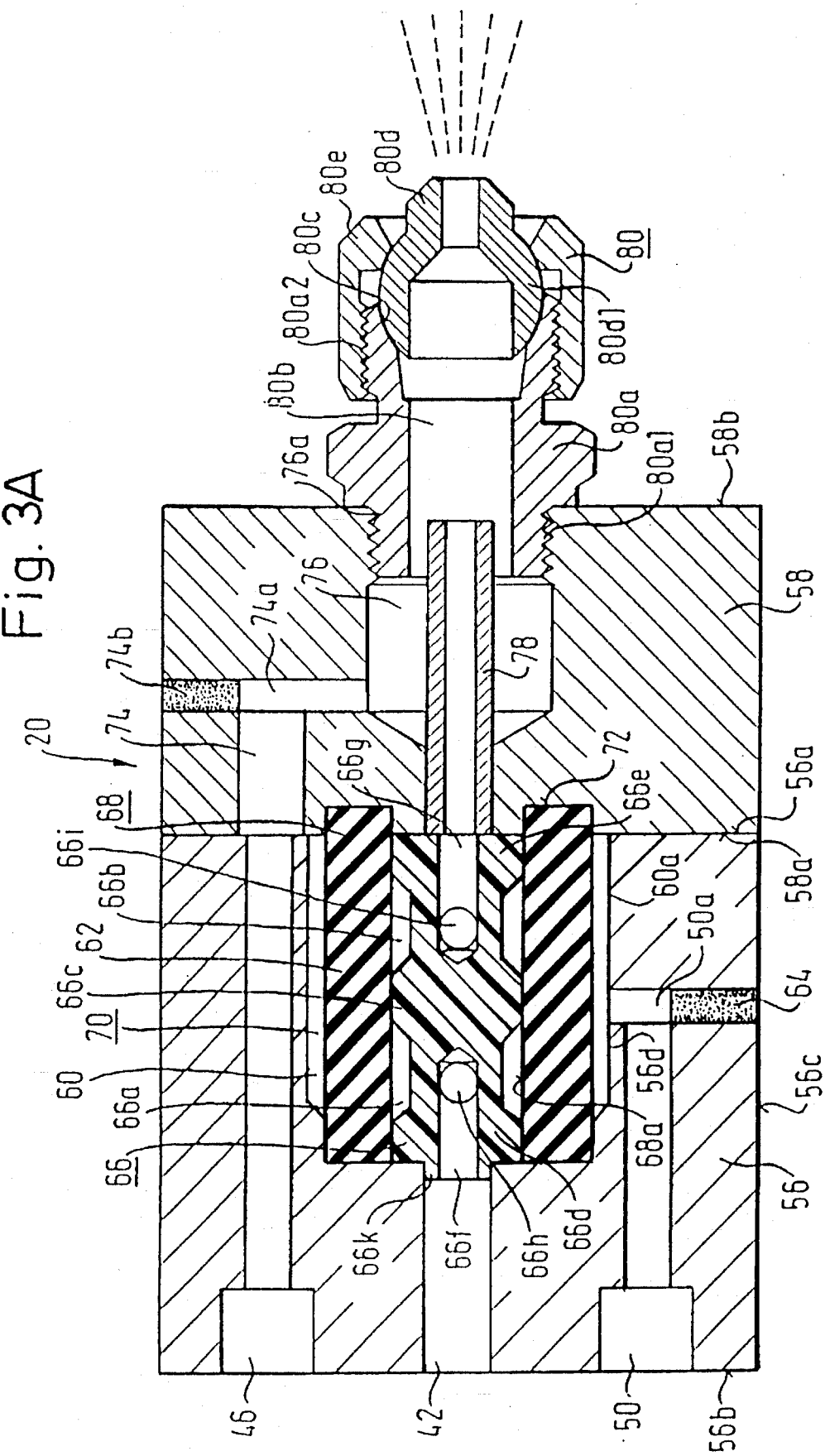

SPRAY ELEMENT ESPECIALLY FOR MOLD SPRAYERS

The invention pertains to a spray element, especially for mold sprayers, comprising a feed line for fluid working medium and possibly a feed line for control air; an atomizing device connected to the feed line for working medium; and a switching valve, which can be controlled as a function of pressure, with an elastically pretensioned valve body for the optional making or breaking of the connection between the feed line for working medium and the atomizer.

Spray elements of this type are used in, for example, the spray tools of the mold spray devices required between the cycles of die-casting, drop forging, and other manufacturing operations involving the hot and cold working of metals to prepare the parts of the die for the next sequence of operations. For this purpose, the die is opened, and the spray tool is moved in between the parts, which are then cleaned of metal residues, lubricant residues, and other contaminants by the use of compressed air. They are then sprayed with a lubricant and can also be cooled with water.

Spray elements of the basic type in question are known, for example, from U.S. Pat. No. 4,714,199 and No. 4,365,754. In these spray elements, the valve body of the switching valve consists of a piston. The piston is pretensioned by a helical spring to keep the switching valve in the closed position, and in this position the piston thus prevents fluid working medium from passing through the switching valve and reaching the atomizer. According to what has been said above, the spray elements known from U.S. Pat. No. 4,714,199 and No. 4,365,754 have a complicated and, therefore, expensive design.

Another spray element of the general type in question is known from U.S. Pat. No. 3,807,641. In this spray element, the valve body of the switching valve is formed by a flexible membrane, which is pretensioned by a piston, which is itself pretensioned by a helical compression spring to keep the switching valve in the closed position. As result, the spray element known from U.S. Pat. No. 3,807,641 also has a complicated and, therefore, expensive design.

Against this background, The task of the present invention is to provide a spray element of the general type in question which is simpler in design and which therefore can be produced at lower cost.

This task is accomplished in accordance with The invention in that the valve body is designed to have an internal elastic pretension. By virtue of this measure specified in accordance with the invention, the valve body exercises not only its normal function, namely, of sitting on the valve seat and thus preventing the passage of working medium and, when the valve is opened, of rising above the seat and allowing the passage of working medium, but also the additional function of pretensioning the valve body (that is, of pretensioning itself) in the closing or opening direction of the switching valve. Because several functions are thus combined in a single component according to the invention, the number of components required to realize the spray element is reduced. Therefore, the spray element is simple in design and can thus be fabricated at low cost.

A valve body with the desired properties can be easily produced by making it out of an essentially elastic material, preferably a rubbery type of elastic, plastic or rubber. The desired degree of inner pretension can be effectively achieved through the suitable selection of material for the valve body and through the use of a suitable configuration.

So that the entire switching valve can be replaced as a single unit during maintenance, it is proposed that a valve seat element be provided to constitute the switching valve together with the valve body.

An especially simple way of obtaining the valve seat element is to manufacture it by the process of injection molding. Because the valve body is made of an elastic material, especially of a rubbery type of elastic material, the production tolerances which occur in conjunction with production by injection molding, i.e., tolerances which are possibly greater than those which occur in production by turning or boring, for example, can thus be easily compensated.

The switching valve can be easily inserted into the spray element if a recess to hold the switching valve is provided in a first housing part of the spray element. The feed lines for fluid working medium and possibly for control air can also be designed to pass through the first housing part.

The production of the spray element can be further simplified by assigning the atomizing device to a second housing part, which can be attached to, and removed from, the first housing part. When, in the assembled state of the spray element, the second housing part holds the switching valve in the recess which has been provided in the first housing part, easy access to the switching valve is guaranteed for any maintenance or repair operations which may prove necessary.

To simplify the production of the spray element, it is also proposed that at least one of the housing parts be produced by injection molding.

In principle, it is conceivable that the working medium can be atomized either by electrostatic means, by pressure spraying, by allowing it to strike an impact surface at high speed, or by some other method. So that the working medium can be atomized by compressed air, a feed line for working air which can be connected to the atomizing device is also provided in the spray element according to the invention. The atomizing process can occur here either by the internal mixing principle or by the external mixing principle. Both mixing principles are known in themselves. The spray element can be designed very simply by providing a first section of the feed line for working air in the first housing part and a second section of the feed line for working air in the second housing part.

So that all the conventional spray properties can be realized by means of the spray element according to the invention, it is proposed that the atomizing device be designed so that it can be connected to a conventional nozzle assembly.

In a preferred embodiment of the invention, it is provided that the valve seat element is designed as cylindrically symmetric and that it has two ring-shaped recesses, separated by a ring-shaped valve seat projection, on its outside periphery. Each of these ring-shaped recesses is bounded in the axial direction of the valve seat element by a ring-shaped supporting projection, and each recess is also connected by way of an associated transverse bore to an associated blind hole formed in the opposing end surface of the valve seat element, it being possible to connect one of the blind holes to the feed line for working medium and the other blind hole to the atomizing device. It is also provided in this embodiment that the valve body is designed as cylindrically symmetric with a central opening oriented in the axial direction, which has essentially the same diameter as the ring-shaped support projections of the valve seat element, the inside peripheral surface of the valve body resting, both in the opened and in the closed state of the switching valve, against the ring-shaped support projections of the valve seat element to form a seal against them. And finally, a chamber which makes it possible for the valve body to rise up off the valve seat element and which possibly can be connected to the feed line for control air is also provided. In this preferred embodiment, the switching valve is distinguished by an especially simple design. The valve body also assumes the function here of sealing off the switching valve against leakage of fluid working medium.

It is also conceivable in principle that the chamber which makes it possible for the valve body to rise can be formed by undercutting a section of the first housing part. To ensure the design of the spray element remains simple; however, it is proposed that this chamber be formed by a ring-shaped recess in the outside peripheral surface of the valve body.

There are various ways in which the switching valve can operate. For example, the switching valve can be a normally closed valve, which is opened by the action of compressed air. In a further elaboration of the preferred embodiment described above, the design can be kept simple by giving the ring-shaped support projections essentially the same outside diameter as the ring-shaped valve seat projection, and arrangements can also be made to allow the chamber which makes it possible for the valve body to rise to be connected to the feed line for control air. In the open state of the switching valve, the negative control air pressure will cause the internal peripheral surface of the valve body to move a certain distance away from the ring-shaped valve seat projection and therefore allow the passage of working medium. In the closed state of the switching valve, the internal pretension of the valve body causes its internal peripheral surface to rest against the ring-shaped valve seat projection to form a seal against it and thus prevent the passage of working medium.

Alternatively, however, it is possible for the valve seat element to have two additional ring-shaped recesses following after the two ring-shaped support projections in the axial direction, each of these two additional recesses being bounded in the area of the associated axial end of the valve seat element by an additional ring-shaped projection. Both these additional ring-shaped projections and the ring-shaped support projections have essentially the same outside diameter as the ring-shaped valve seat projection. In the area of the additional ring-shaped recesses of the valve seat element, two control chambers which can be connected to the feed line for compressed air are provided, between which the chamber making it possible for the valve body to rise is located. In the open state of the switching valve, the positive control air pressure prevailing in the control chambers causes the inside peripheral surface of the valve body in the area of the chamber which makes it possible for the valve body to rise to be lifted up off the ring-shaped valve seat projection and therefore allows the passage of working medium. In the closed state of the switching valve, the inner pretension of the valve body causes it to rest with its inner peripheral surface against the ring-shaped valve seat projection to form a seal against and thus to prevent the passage of working medium. This embodiment offers the advantage that the valve can be operated with positive control air pressure, which is easy to obtain and manage.

So that it can be ensured in this alternative embodiment that the valve body will rise reliably from the valve seat element, it is proposed that the valve body be provided with essentially rigid inlay elements and that these elements be preferably embedded in the valve body. The embedded elements extend from the control-chamber sections of the valve body associated with the valve chamber in question to an intermediate section of the valve body, which is associated with the chamber which makes it possible for the valve body to rise; a deflection of the inlay elements resulting from a compression of the control chamber section under the action of positive control air pressure is transferred to the intermediate section, where it leads to the expansion of the valve body, which therefore rises up off the valve seat.

To realize an alternative method, the switching valve can be a normally open one, which is closed by the control air pressure. In a further elaboration of the preferred embodiment discussed above, the ring-shaped support projections can have a larger outer diameter than the ring-shaped valve seat projection, and arrangements can be made so that the chamber which makes it possible for the valve body to rise can be connected to the control air feed line. In the open state of the switching valve, the internal pretension of the valve body causes it to remain a certain distance away from the ring-shaped valve seat projection and, therefore, makes it possible for the working medium to pass through. In the closed state of the switching valve, a positive control air pressure causes the internal peripheral surface of the valve body to rest against the ring-shaped valve seat projection of the valve seat element to form a seal against it, thus preventing the passage of working medium. This embodiment also offers the advantage of simplicity of design.

In a realization of yet another alternative method, the switching valve can be a normally closed valve, which is opened by the pressure of the working medium. In this embodiment, the control air feed line can be eliminated, which leads to an additional simplification of the design. In an elaboration of the preferred embodiment described above, the ring-shaped support projections can, in this case, have essentially the same outside diameter as the ring-shaped valve seat projection. Thus, in the open state of the switching valve, a positive working medium pressure causes the internal peripheral surface of the valve body to remain a certain distance away from the ring-shaped valve seat projection and, therefore, makes it possible for the working medium to pass through. In the closed state of the switching valve, the internal pretension of the valve body causes its internal peripheral surface to rest against the ring-shaped valve seat projection to form a seal against it and thus prevents the passage of working medium.

So that the proper function of the switching valve can be ensured at all times, it is proposed that the chamber making it possible for the valve body to rise be connected by way of a compensating line to the environment.

To increase the operational reliability of the spray element according to the invention, it is also proposed that a pressure-monitoring device be installed in the control air feed line. It is possible, for example, for the supply of working medium to be cut off whenever this pressure monitor detects an abnormal value of the control air pressure. This is advantageous especially in the case of a normally open switching valve which is closed by control air pressure.

The invention also pertains to a valve seat element, to a valve body, and to a switching valve for a spray element according to the invention.

In addition, the invention pertains to a spray element, especially for die sprayers, comprising a feed line for fluid working medium, a feed line for working air, and an atomizer connected to the feed lines for working medium and working air, a pivoting nozzle element being assigned to the atomizer.

Spray elements of this type are known and are used, for example, in the die sprayers of the applicant so that sprayers can be set up as effectively as possible at the place where they are needed to meet the specific requirements of the work in question through the adjustment of the spray direction of the individual spray elements. It has been found in practice, however, that the known spray elements generate a relatively large amount of noise, with the result that the operators must work with hearing protection.

Against this background, it is a further goal of the invention to provide a spray element of the type described above which is distinguished by a considerable reduction in the amount of noise generated without sacrifice of the pivoting capacity of the nozzle element.

This goal is accomplished in accordance with the invention in that the atomizer operates according to the external mixing principle and in that a section of the working medium feed line leading to the pivoting nozzle element is designed as a section of flexible tubing. The air pressure required to atomize the working medium by the external mixing principle to produce a given set of atomization properties is smaller than that required for atomization by the internal mixing principle, according to which the conventional spray elements operate with a pivoting nozzle. According to the internal mixing principle, a mixing chamber must be provided, from which the compressed air emerges at high velocity to atomize the working medium sufficiently and to preserve the achieved atomization properties until after the mist has emerged from the nozzle element. According to the external mixing principle, the working medium is atomized only after it has emerged from the nozzle. At this point, the working air can be made highly turbulent even without the help of a high working air pressure, which means that the working medium can still be atomized effectively. In addition, a relatively low working air pressure is sufficient to supply the working air to the outlet, because the nozzle element can be designed with large open cross sections for the compressed air. The latter design feature is possible, because there is no dynamic pressure to be overcome in the atomizer. The effects described above, which,are mutually supportive, lead to a considerable reduction in the amount of noise generated without having any effect on the desirable properties of the atomized material. Through the use of a section of flexible tubing, the capacity of the nozzle element to pivot is retained at the same time.

The section of tubing can be fabricated inexpensively by making it of rigid plastic.

So that not only the spray direction but also the spray pattern of the spray element can be adjusted to the requirements of the specific application, it is proposed that the relative position of the orifice of the feed line for working medium and an outlet of the nozzle element be adjustable in the longitudinal direction of the working medium feed line.

This can be achieved in accordance with an alternative elaboration of the invention by, for example, providing the nozzle element with a central bore, through which the flexible section of tubing extends up to a point near the outlet. In this case, the position of the orifice of the tube can be adjusted simply by pushing the tube back and forth in the central bore relative to the outlet. The tube can be held in the central bore by the frictional forces resulting from a narrow-tolerance fit. It is also possible, however, for the tube to be held in position in the central bore by suitable fastening means such as a stud screw.

According to another alternative elaboration of the invention, it is provided that the nozzle element has a central bore provided with an internal, ring-shaped rib; that the flexible section of tubing can be inserted into the central bore essentially up as far as the ring-shaped rib; and that a tubular endpiece, which can be shifted in the longitudinal direction of the central bore, can be inserted from the outlet side into the central bore. The tubular endpiece can be designed so that it can screwed into the central bore to adjust its position in the longitudinal direction in the central bore. The endpiece can also be held in place in the central bore by a suitable fastener such as a stud screw.

A further noise reduction can be achieved by providing a deflector wall for the arriving working air near the outlet. Such a wall increases the turbulence of the working air, which increases in turn the atomization of the working medium; or, if there is no need to increase the degree of atomization, the use of the deflector makes it possible to work with a lower working air pressure, which leads to a corresponding decrease in noise generation.

The invention also pertains to a nozzle element for use in a spray element according to the invention.

The invention is described in greater detail below on the basis of the attached drawing and a group of exemplary embodiments:

FIG. 1 is a schematic diagram of a die sprayer, in the spray tool of which the spray element according to the invention can be installed;

FIG. 2 shows a schematic diagram of a spray tool equipped .with spray elements according to the invention;

FIG. 3 shows a first embodiment of a spray element according to the invention;

FIG. **3*a* shows an alternative embodiment of the spray element as shown in FIG. 3**;

FIG. 4 shows a second embodiment of a spray element according to the invention;

FIG. 5 shows a third embodiment of a spray element according to the invention;

FIG. 6 shows a fourth embodiment of a spray element according to the invention with a closed switching valve;

FIG. 7 shows a view of the fourth embodiment similar to that of FIG. 6, but with an open switching valve;

FIG. 8 shows a cross section through a valve body for the fourth embodiment on an enlarged scale;

FIG. 9 shows a schematic, perspective diagram of an inlay element assembly for a valve body according to FIG. 8;

FIG. 10 shows a first embodiment of a spray nozzle element;

FIG. 11 shows a second embodiment of a spray nozzle element; and

FIG. 12 shows a third embodiment of a spray nozzle element.

FIG. 1 shows a schematic diagram of a die sprayer, referred to as 10 in the following, which can be used, for example, to prepare die components **12*a* and 12*b* of a die 12 for the next stage of work in the production of structural components by means of a die-casting method such as aluminum die-casting. In a die-casting method such as this, a filling chamber 15*a* of a filling device 15 is loaded through fill opening 15*b*** with the liquid metal to be processed.

Then the metal is forced by a pressure piston **15*c* into die 12. After the component thus fabricated has solidified completely, it is removed from the die. Die parts 12*a*, 12*b* of die 12 are mounted for this purpose on a stationary clamping plate 13*a* and a movable clamping plate 13*b*, respectively. Movable clamping plate 13*b* can be shifted back and forth in the directions of double arrow F to open and close die 12. Although only two clamping plates 13*a*, 13*b* with two die parts 12*a*, 12*b* are shown in FIG. 1**, it is also possible, of course, to use dies with more than two parts and a corresponding number of clamping plates.

Die sprayer 10 comprises a first travel unit 14, which is mounted permanently on an upper edge **13*c* of stationary clamping plate 13*a*. A second travel unit 16 is connected to first travel unit 14. This second unit can be moved horizontally back and forth, relative to first travel unit 14, in the direction of double arrow A by means of an arm 16*a*, guided in first travel unit under the action of a drive (not shown). In a similar manner, a spray tool 18, which carries a plurality of spray elements 20, can be moved vertically up and down relative to second travel unit 16 in the direction of double arrow by means of an arm 18a guided in second travel unit 16** under the action of a drive (also not shown).

First travel unit 14 is connected to supply lines 22 for fluid working medium, to a supply line 24 for working air or blasting air, and to a supply line 26 for control air. These supply lines 22, 24, 26 are guided from first travel unit 14 all the way to spray tool 18. For the sake of clarity in the drawing, however, only the sections of these lines leading to first travel unit 14 are shown in FIG. 1.

Supply lines 22 for the working medium comprise a supply line 22a for water and a supply line 22b for lubricant. It is also possible, however, to provide additional supply lines 22 for working media such as for a second type of lubricant or the like, as indicated in FIG. 1 by dash-dot line 22c. A valve device 28 is provided in spray tool 18 or immediately in front of it so that the various supply lines 22a, 22b, etc., for working medium can be connected for service.

So that die 12 can be prepared for the next sequence of operations, die 12 is first opened and the finished part is removed. Then spray tool 18 is moved between the two halves 12a, 12b of the die by means of arms 16a, 18a. Then die parts 12a, 12b are cleaned of metal residues, lubricant residues, and other contaminants; cooled by sprays of water; sprayed with lubricant to prepare them for the next step of the work cycle; and possibly dried with blasts of air.

Figure 2:
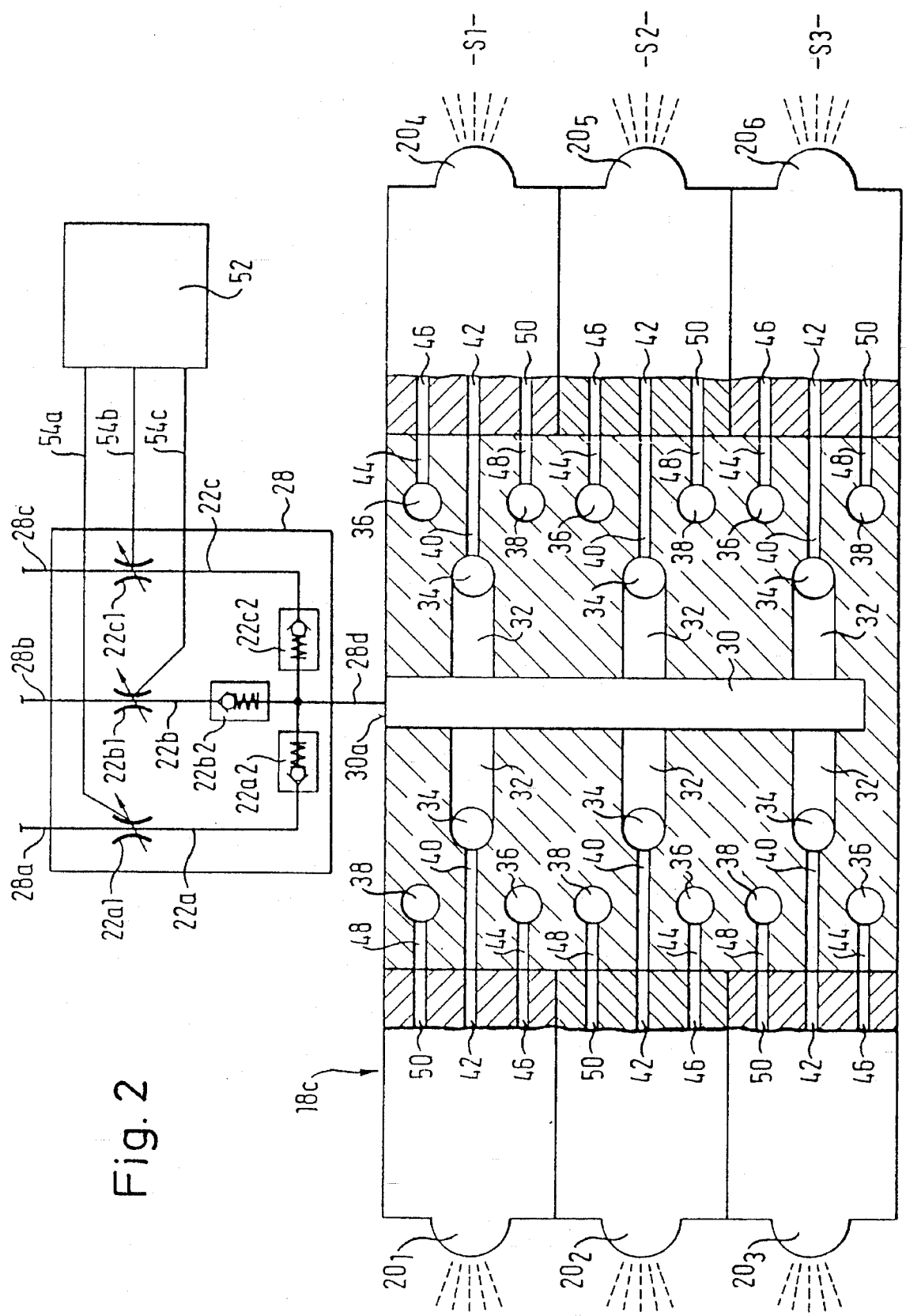

FIG. 2 shows a detailed drawing of the design of spray tool 18. In the present example, six spray elements 20 are installed on spray tool 18. The number and orientation of the spray elements can be varied in any way desired as a function of the specific application.

In spray tool 18, a main working medium line 30 is provided, from which secondary lines 32 branch off; in the drawing according to FIG. 2, these secondary lines extend in the plane of the drawing. From these secondary lines 32, junction working medium lines 34 branch off in turn, which, in the drawing according to FIG. 2, extend through the spray tool at a right angle to the plane of the drawing. In addition, junction lines 36 for blasting air or working air and 38 for control air are also provided in spray tool 18, again extending at a right angle to the plane of the drawing. These junction lines 36, 38 are connected to corresponding (not shown) main and secondary lines for working air and control air, respectively, which are designed in the same way as lines 30 and 32. The open ends of junction lines 34, 36, and 38 are sealed by cover plates 18b (see FIG. 1).

Spray elements 20 can be coordinated into a plurality of control circuits. For example, in FIG. 2, spray elements $20_1$ and $20_4$ are combined into a control circuit S1; spray elements $20_2$ and $20_5$ are combined into a control circuit S2; and spray elements $20_3$ and $20_6$ are combined into a control circuit S3.

This coordination can be realized in a simple way by connecting each of junction lines 38 for control air, i.e., the junction line assigned to spray elements $20_1$ and $20_4$ of control circuit S1, the junction line assigned to spray elements $20_2$ and $20_5$ of control circuit S2, and the junction line assigned to spray elements $20_3$ and $20_6$ of control circuit S3, to a separate main line for control air. The main control air lines of the individual control circuits can be supplied with control air independently of each other by means of, for example, a valve device (not shown).

From junction lines 34 for working medium, feed bores 40 lead to corresponding working medium feed lines 42 of spray elements 20; from junction lines 36 for working air, feed bores 44 lead to corresponding working air feed lines 46 of spray elements 20; and from junction lines 38 for control air, feed bores 48 leads to corresponding control air feed lines 50 of spray elements 20.

Inlet 30a of main line 30 for working medium shown in FIG. 2 is connected to an outlet line 28d of valve device 28. Supply lines 22a, 22b, and 22c are connected to inlet lines 28a, 28b, and 28c, respectively, of valve device 28. A flow rate control valve 22a1, 22b1, and 22c1 and a check valve 22a2, 22b2, and 22c2 are installed in each of inlet lines 28a, 28b, and 28c, respectively.

The pass-through openings of control valves 22a1, 22b1, and 22c1 can be adjusted independently of each other by means of a control unit 52 acting through control lines 54a, 54b, and 564c. For example, by opening valve 22a1 and closing valves 22b1 and 22c1, only water can be supplied as the working medium; by opening valve 22b1 and closing valves 22a1 and 22c1, only lubricant can be supplied; or by opening of valves 22a1 and 22b1 appropriately and closing valve 22c1, a lubricant mixture in a desired ratio can be supplied as working medium. Control unit 52 can be used to achieve wide variations in the discharge rates, viscosities, etc. of the working media to be mixed by varying, for example, the degrees to which valves 22a1, 22b1, 22c1 are opened.

Figure 3:
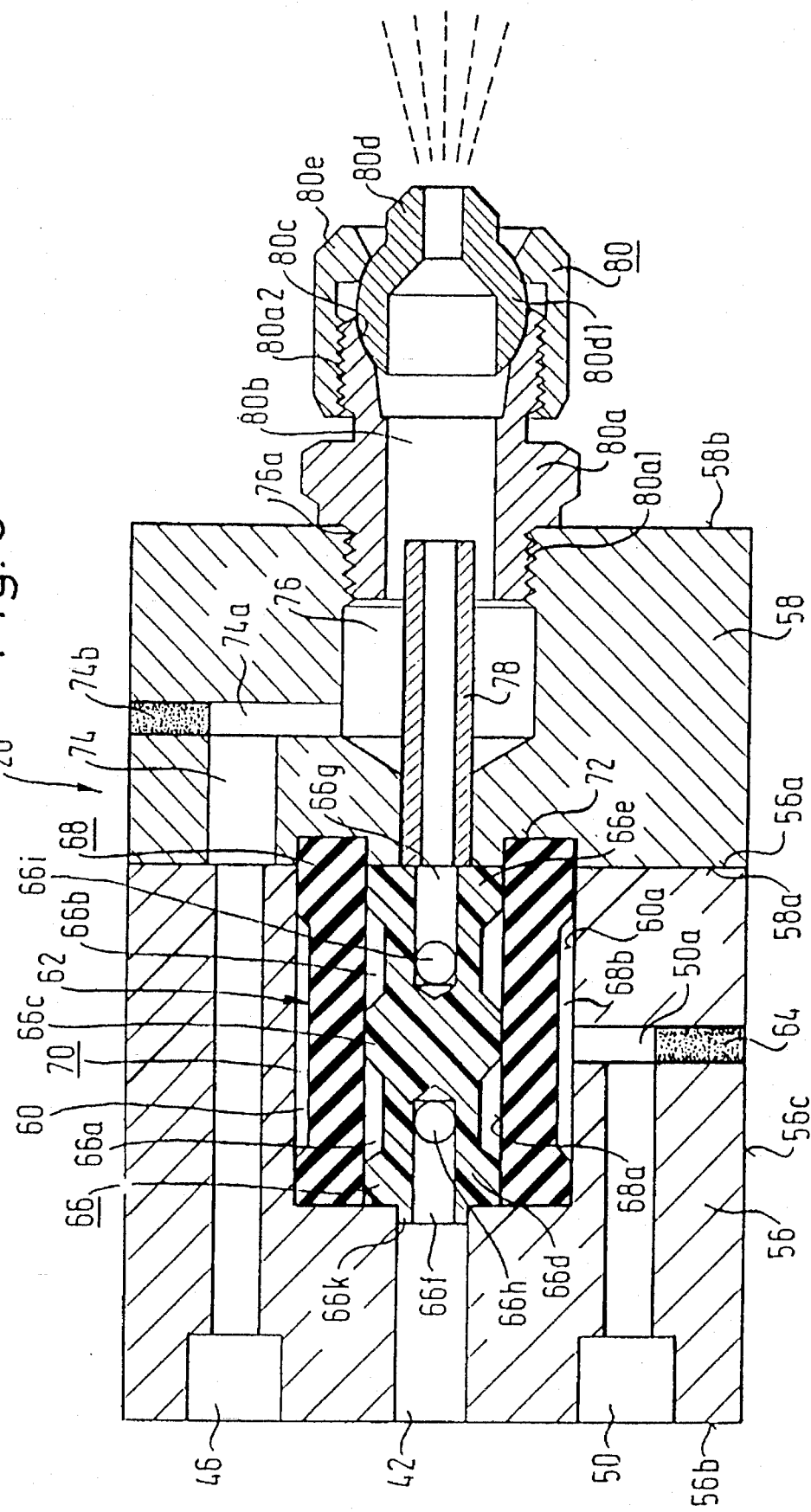

FIG. 3 shows a first embodiment of a spray element 20 according to the invention. Spray element 20 comprises a first housing part 56 and a second housing part 58, which are preferably manufactured as injection-molded parts, with surfaces 56a and 58a resting against each other. The two parts are screwed together by means of threaded bolts (not shown). Feed line 42 for fluid working medium, feed line 46 for working air, and feed line 50 for control air are provided in first housing part 56.

Feed line 42 for working medium starts from a surface 56b facing away from surface 56a and extends toward surface 56a, ending at a recess 60 of circular cross section, which is open toward surface 56a. Recess 60 holds a switching valve 62, the structure of which will be described in detail further below. Feed line 46 for working air connects the two surfaces 56a, 56b to each other, and feed line 50 for control air, which also proceeds from surface 56b, ends at transverse bore 50a, which connects an outside peripheral surface 56c of the spray element with inside peripheral surface 60a of recess 60. The outer end of transverse bore 50a is sealed tightly by a plug.

In the ready-to-operate state of spray element 20, a switching valve 62 is present in recess 60 of the first housing part 56, as already described above. This valve comprises a valve seat element 66 and a valve body 68. The symmetry of both valve seat element 66 and valve body 68 is essentially cylindrical.

Figure 5:
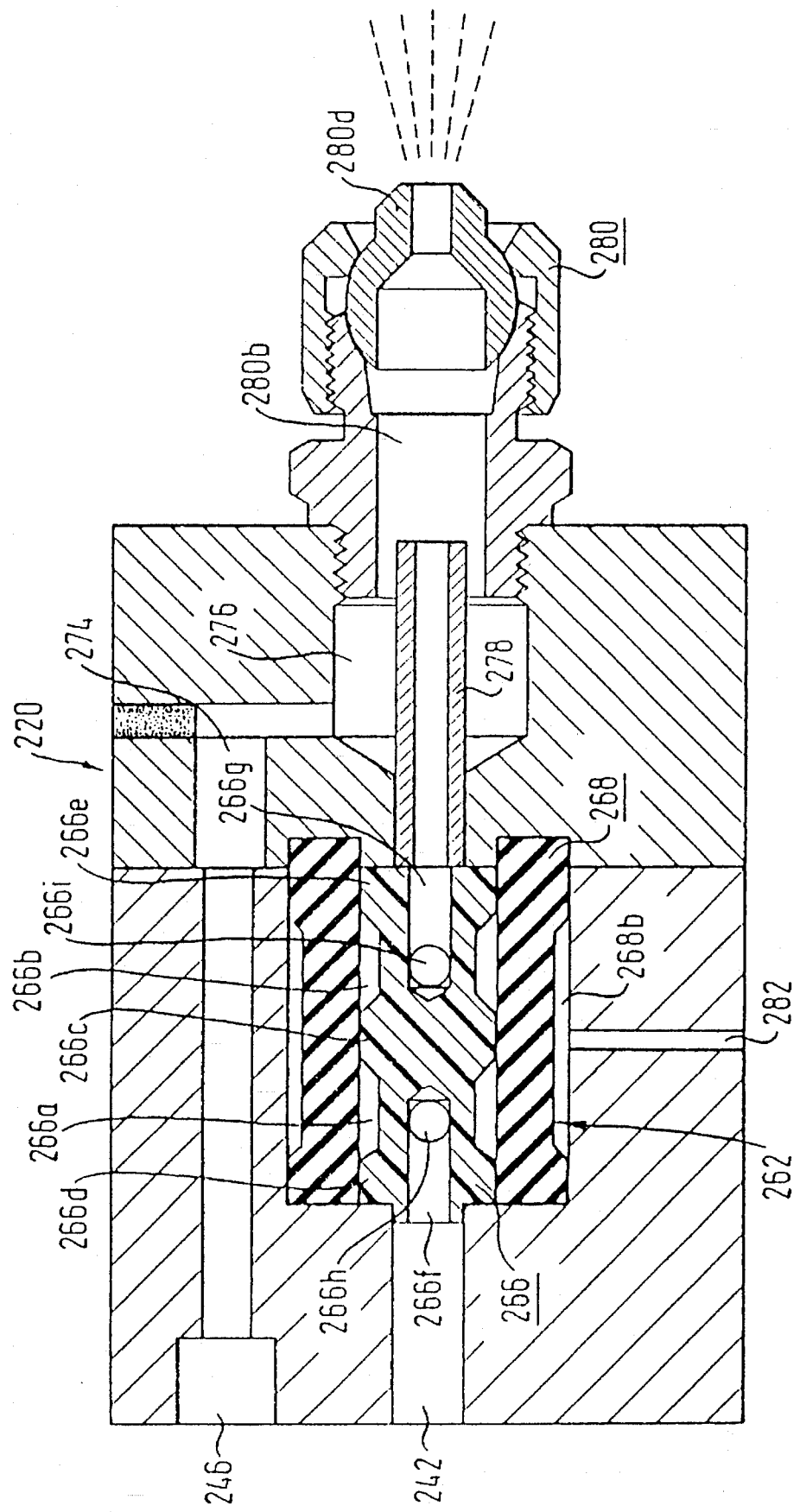

Valve seat element 66 has on its outside peripheral surface two ring-shaped recesses 66a, 66b, which are separated in the axial direction by a ring-shaped projection 66c, forming a valve seat, and bounded by two additional ring-shaped projections 66d, 66e. Ring-shaped projections 66c, 66d, and 66e all have essentially the same outside diameter. From the axial ends of valve seat element 66, blind holes 66f, 66g proceed, the blind ends of which are connected by transverse bores 66h, 66i to ring-shaped recesses 66a, 66b. To center valve seat element 66 in recess 60, a tubular shoulder 66k of the element engages in feed line 42 for working medium. The axial length of valve seat element 66 is calculated in such a way that, in the operating state of spray element 20, its end surface is essentially flush with surface 58*a*. Valve seat element 66 is preferably made as an injection-molded part.

Valve body 68 is tubular in design and surrounds valve seat element 66. For this purpose, an inside diameter of its passage 68*a* is essentially the same as or slightly smaller than the outside diameter of ring-shaped projections 66*c*, 66*d*, and 66*e* of valve seat element 66. On the outside periphery of valve body 68, there is a ring-shaped recess 68*b*, which cooperates with inside peripheral surface 60*a* of recess 60 to define a chamber 70, which makes it possible for valve body 68 is rise up from valve seat 66*c*. The outside diameter of valve body 68 is essentially the same as the inside diameter of recess 60.

Alternatively, chamber 70 could also be formed by an undercut 56*d* as shown in FIG. 3*a*. In this case, there would be no need for the ring-shaped recess 68*b* on the outer periphery of valve body 68.

In the operating state, valve seat element 68 of spray element 20 projects beyond surface 56*a* and engages in a ring-shaped groove 72, formed in second housing part 58, this groove being used to center switching valve 62. Feed line 46 for blasting air continues in second housing part 58 as a line 74, which ends in a mixing chamber 76 by way of a transverse bore 74*a*, tightly sealed by a plug 74*b* at its outer end. Chamber 76 opens out onto a surface 58*b* of the second housing part facing away from surface 58*a*. This orifice 76*a* accepts a nozzle assembly 80.

Nozzle assembly 80 comprises a tubular main part 80*a*, at one end of which an externally threaded section 80*a*1 is provided. Main part 80*a* is screwed into orifice 76*a* of second housing part 58 by means of this externally threaded section 80*a*1. At its other end, main part 80*a* is designed with an externally threaded section 80*a*2. In the area of this externally threaded section 80*a*2, an inside space 80*b* of main part 80*a* is provided with an essentially spherical inside surface 80*c*. A ball joint 80*d*1 of a nozzle element 80*d* rests against this inside surface 80*c;* the ball is held in position by a cap nut 80*e* screwed onto externally threaded section 80*a*2.

A section of tubing 78 connected to blind hole 66*g* in the valve seat element passes through chamber 76 and projects into inside space 80*b* of main part 80*a*. In this inside space 80*h*, working medium emerging from tube 78 is atomized according to the so-called internal mixing principle by compressed air arriving from mixing chamber 76 and thus is blown out through nozzle element 80*d*.

In the following, the function of spray element 20 according to FIG. 3 is explained. Switching valve 62 of spray element 20 is normally a closed valve, which is opened by a negative control air pressure. In FIG. 3, the normal state of switching valve 62 is shown, that is, its closed state. In this state, the inside peripheral surface of valve body 68 rests against valve seat 66*c* to form a seal and therefore prevents the working medium coming through line 42, blind hole 66*f*, transverse bore 66*h*, and ring-shaped recess 66*a*, from passing between valve seat 66*c* and valve body 68 and then continuing through ring-shaped recess 66*b*, transverse bore 66*i*, blind hole 66*g*, and section of tubing 78 into inside space 80*b* of nozzle assembly 80.

But when a negative control air pressure is applied via control air line 50 to chamber 70, valve body 68 is lifted up off of valve seat 66*c* by this negative pressure and allows the passage of working medium between valve seat 66*c* and valve body 68. Fluid working medium now arrives from feed line 42 in interior space 80*b* of nozzle assembly 80, where it is atomized by the blasting air conducted via feed lines 46, 74, 74*a* and chamber 76 into interior space 80*b*. The medium is then carried to nozzle element 80*d*, from which it emerges as a mist.

Valve body 68 is made of an elastic material such as rubber and is produced with an internal pretension, which pretensions it in the closed position; that is, in the position in which it prevents the passage of working medium between valve seat 66*c* and valve body 68.

The design of switching valve 62 as a normally closed valve offers the advantage that, for example, in the event that the control system fails because of a power outage, any further escape of working medium is reliably prevented. It is also possible, however, to design the switching valve as a normally open valve, which is closed by the control air pressure.

FIG. 4 shows a spray element equipped with a normally open switching valve of this type, which is closed by control air pressure. In FIG. 4, similar parts are provided with the same reference symbols as those used in FIG. 3, except that they are increased by 100. Spray element 120 is described in the following only insofar as it differs from spray element 20 according to FIG. 3. Otherwise, reference is made here explicitly to the description of spray element 20.

According to FIG. 3, spray element 120 differs from spray element 20 only in that ring-shaped valve seat projection 166*c* of valve seat element 166 of switching valve 162 has an outside diameter which is smaller than that of ring-shaped projections 166*d*, 166*e*. Because the diameter of the tubular opening of valve body 168 has the same diameter as that of ring-shaped projections 166*d*, 166*e* or a diameter only slightly smaller, a gap Sp is present between the inside peripheral surface of valve body 168 and the outside peripheral surface of valve seat 166*c* in the normal state of switching valve 162; that is, in the state unactuated by control air pressure. Because of this gap Sp, it is possible for fluid working medium to pass from line 142 through blind hole 166*f* and transverse bore 166*h* to ring-shaped recess 166*a* and then to flow between valve seat 166*c* and valve body 168 into ring-shaped recess 166*b*, and from there through transverse bore 166*i*, blind hole 166*g*, and section of tubing 178 into interior space 180*b* of nozzle assembly 180. Here the working medium is atomized by the blasting air conducted via feed lines 146, 174 and chamber 176 into interior space 180*b* of nozzle assembly 180. The medium is then conducted to nozzle element 180*d*, from which it emerges as a mist.

To block the passage of working medium between valve seat 166*c* and valve body 168, a positive pressure is applied to chamber 170 (the chamber which makes it possible for the valve body to rise) via control air feed line 150; this positive pressure presses valve body 168 against valve seat 166*c*. Through adjustment of the control air pressure, it is also possible effectively to meter the amount of working medium being supplied. Valve body 168, which is made of an elastic material, preferably of a rubbery type of elastic material, is pretensioned in such a way that it returns automatically to its normal or open position shown in FIG. 4 as soon as the positive control air pressure has been turned off.

In control air feed line 150, a pressure sensor 184 is installed, which measures the value of the pressure prevailing in the feed line and sends this information to control unit 52 (see FIG. 2). Whenever pressure monitor 184 in feed line 150 detects an unintended pressure drop, control unit 52 closes control valves 22*a*1, 22*b*1, 22*c*1 (see FIG. 2), so that no more working medium can be supplied through control line 142.

FIG. 5 shows a third embodiment of a spray element according to the invention equipped with a normally closed switching valve, which is opened by the pressure of the working medium. In FIG. 5, similar parts are provided with the same reference symbols as those in FIG. 3, except that they are increased by 200. Spray element 220 is described in the following only to the extent that it differs from spray element 20 according to FIG. 3. Otherwise, reference is made explicitly here to the description of spray element 20.

According to FIG. 3, spray element 220 differs from spray element 20 primarily in that no line corresponding to control air feed line 50 is provided. Ring-shaped projection 266c forming the valve seat has essentially the same diameter as that of ring-shaped projections 266d, 266e. Therefore, in the normal or closed state of switching valve 262 shown in FIG. 5, valve body 268, by virtue of its internal pretension, rests with its inside peripheral surface firmly on valve seat 266c.

When working medium is now introduced into ring-shaped recess 266a via feed line 242, blind hole 266f, and transverse bore 266h, it cannot pass by valve seat 266c into ring-shaped recess 266b, because the hydraulic force exerted by the pressure of the working medium on valve body 268 is at first smaller than the force of the internal pretension of valve body 268. When the pressure of the working medium rises above a limit pressure PG, however, the internal pretension of valve body 268 is overcome by the hydraulic force and the valve body is lifted up off of valve seat 266c. Working medium is thus able now to pass into ring-shaped recess 266b and then to proceed through transverse bore 266i, blind hole 266g, and section of tubing 278 into the interior space 280b of nozzle assembly 280. Here the working medium is atomized by the blasting air conducted via feed lines 246, 274, and mixing chamber 276 into interior space 280b of the nozzle assembly 280; and the atomized medium is then carried onwards to nozzle element 280d, from which it emerges as a spray mist.

To be able to ensure that valve body 268 is always lifted up off of valve seat 266c at the same limit pressure $p_G$, a compensating bore 282 is provided, which connects ring-shaped space 268b on the outer periphery of valve body 268 to the outside environment. Valve body 268 does not return to its closed position shown in FIG. 5 until a second limit pressure $p_G'$ is reached, which is smaller than limit pressure $p_G$, because the surface area of valve body 268 acted on by the hydraulic pressure in the open state is greater than the surface area of the valve body acted on by The hydraulic pressure in the closed state.

Figure 6:
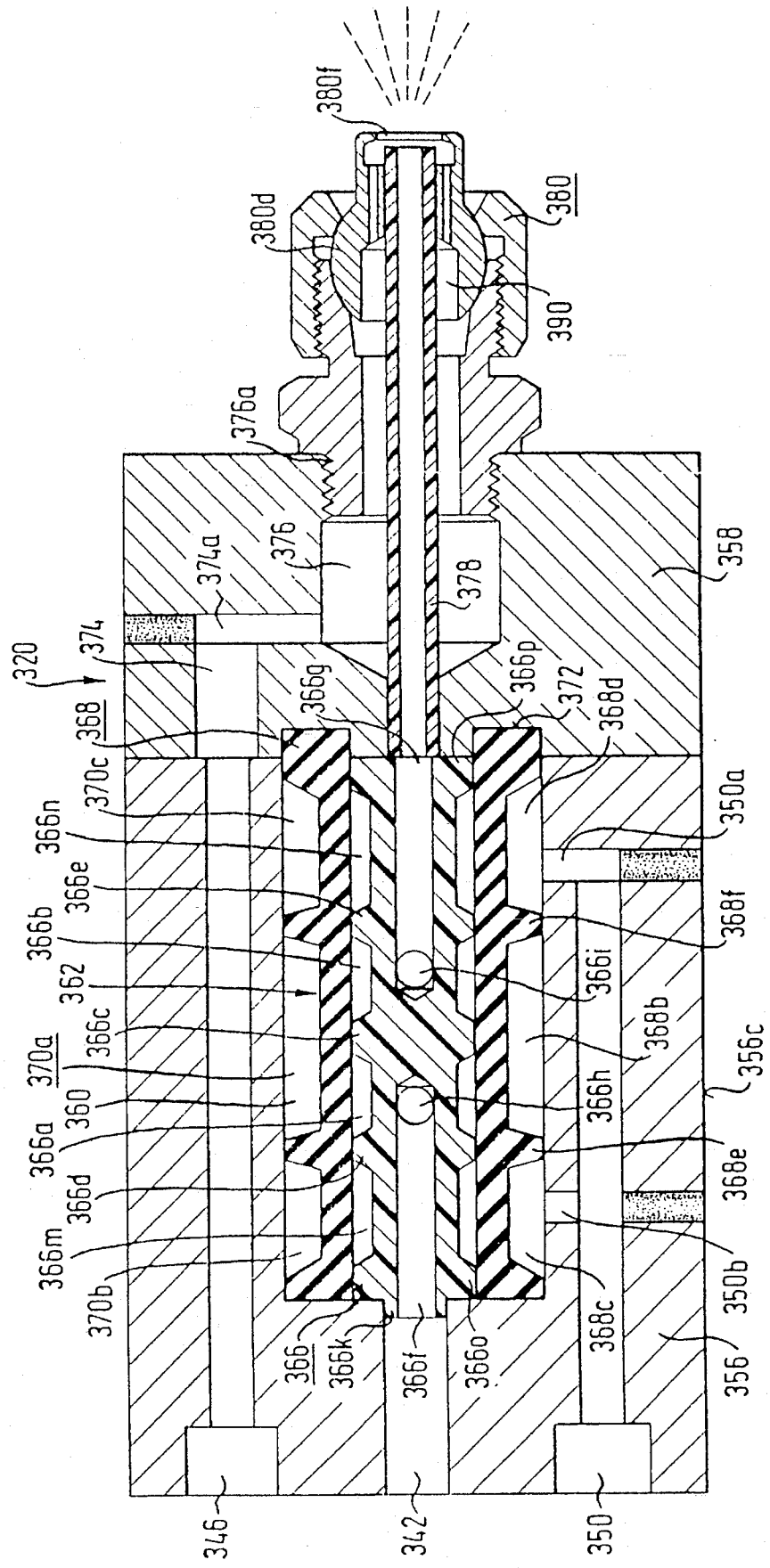

FIG. 6 shows a fourth embodiment of a spray element according to the invention, where similar parts are provided with the same references symbols as those used in FIG. 3, except that they are increased by 300. Spray element 320 is described in the following only to the extent that it differs from spray element 20 according to FIG. 3. Otherwise, reference is made explicitly here to the description of spray element 20.

Spray element 320 is equipped, like spray element 20 according to FIG. 3, with a normally closed switching valve 362, which is opened by control air. Switching valve 362, however, is designed in such a way that it can be opened by means of a positive control air pressure.

Valve seat element 366 has on its outside peripheral surface not only ring-shaped recesses 366a, 366b, which are bounded by ring-shaped projections 366d, 366e and connected to blind holes 366f, 366g, but also two additional ring-shaped recesses 366m, 366n, which are bounded by ring-shaped projections 366d, 366e and by two additional ring-shaped projections 366o, 366p. Ring-shaped projections 366c, 366d, 366e, 366o, 366p all have essentially the same outside diameter.

Valve body 368 has a tubular design. Its inside diameter is essentially the same as, or slightly smaller than, the outside diameter of ring-shaped projections 366c, 366d, 366e, 366o, 366p of valve seat element 366.

On the outside periphery of valve body 368, a ring-shaped recess 368b is provided, which, with the cooperation of the inside peripheral surface of recess 360, defines a chamber 370a, which makes it possible for valve body 368 to be lifted up off of valve seat 366c. In the assembled state of switching valve 362, chamber 370a extends essentially over the area of ring-shaped recesses 366a, 366b of valve seat element 366. Valve body 368 also has two ring-shaped recesses 368c, 368d, which, with the cooperation of the inside peripheral surface of recess 360, define two chambers 370b, 370c. Chambers 370a, 370b, and 370c are separated from each other by ring-shaped projections 368e, 368f of valve body 368. In the assembled state of switching valve 362, chambers 370b, 370c extend essentially over the area of ring-shaped recesses 366m, 366n of valve seat element 366.

Chambers 370b, 370c are connected by transverse bores 350b, 350a to control air feed line 350. Chambers 370b, 370c can also be formed, alternatively, by undercuts in first housing part 356.

In the following, the function of switching valve 362 is explained in greater detail with reference to FIGS. 6 and 7.

Switching valve 362 of spray element 320 is a normally closed valve, which is opened by control air pressure. According to FIG. 3, in contrast to switching valve 62, switching valve 362 can be opened by a positive control air pressure.

FIG. 6 shows the normal state of switching valve 362, that is, its closed state. In this state, the inside peripheral surface of valve body 368 rests to form a seal against valve seat 366c and, therefore, prevents the flow of working medium from line 342 to nozzle assembly 380.

Figure 7:
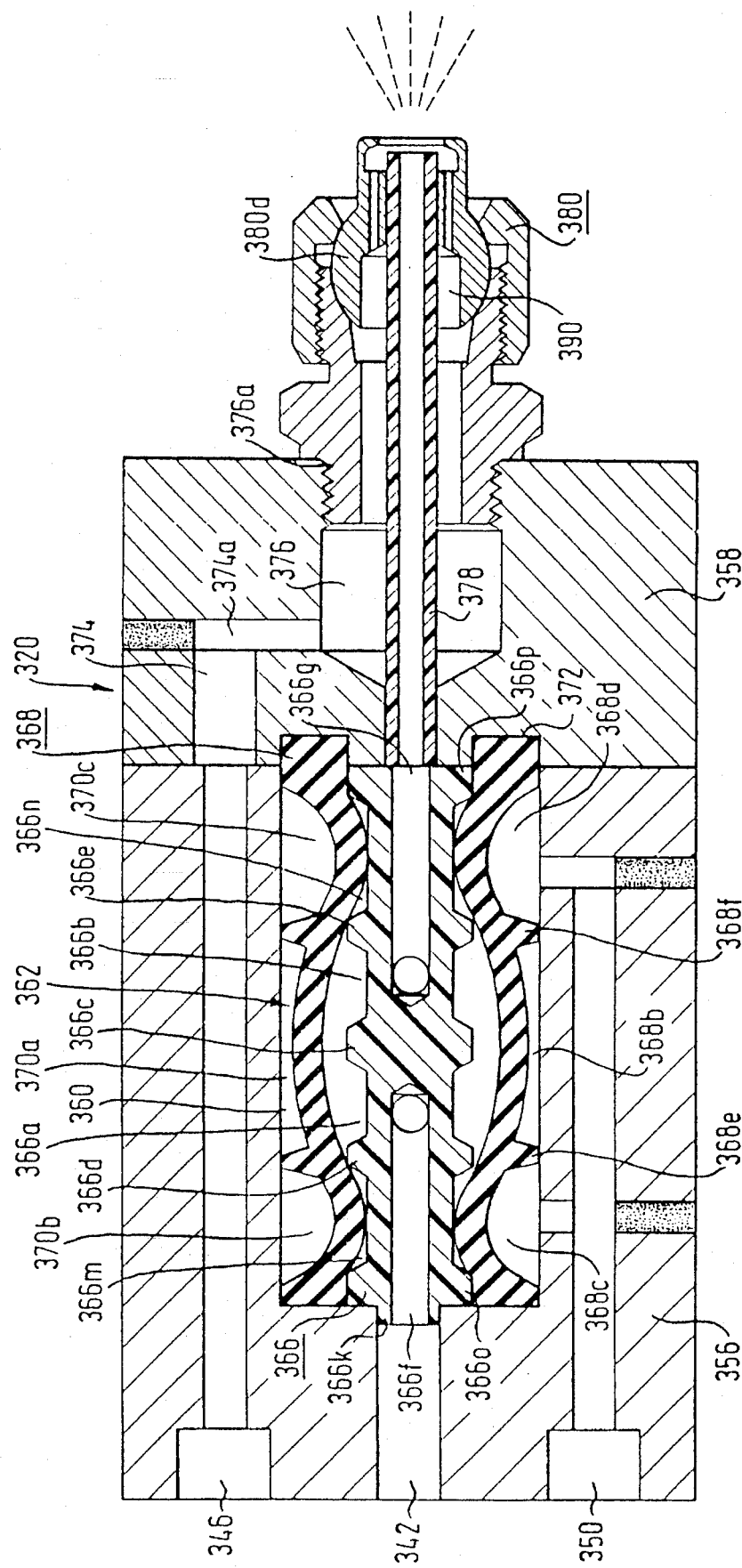

But when a positive control air pressure is applied to chambers 370b, 370c through control air line 350, valve body 368, as shown in FIG. 7, is pressed by this positive pressure into ring-shaped recesses 366m, 366n. This deformation of valve body 368 also extends into the area of valve body 368 situated near chamber 370a; ring-shaped projections 368e, 368f of the valve body act as pivot lines, with the result that valve body 368 is lifted up off of valve seat 366c in the area of chamber 370a; and working medium is now able to flow between valve seat 366c and valve body 368.

Figure 8:
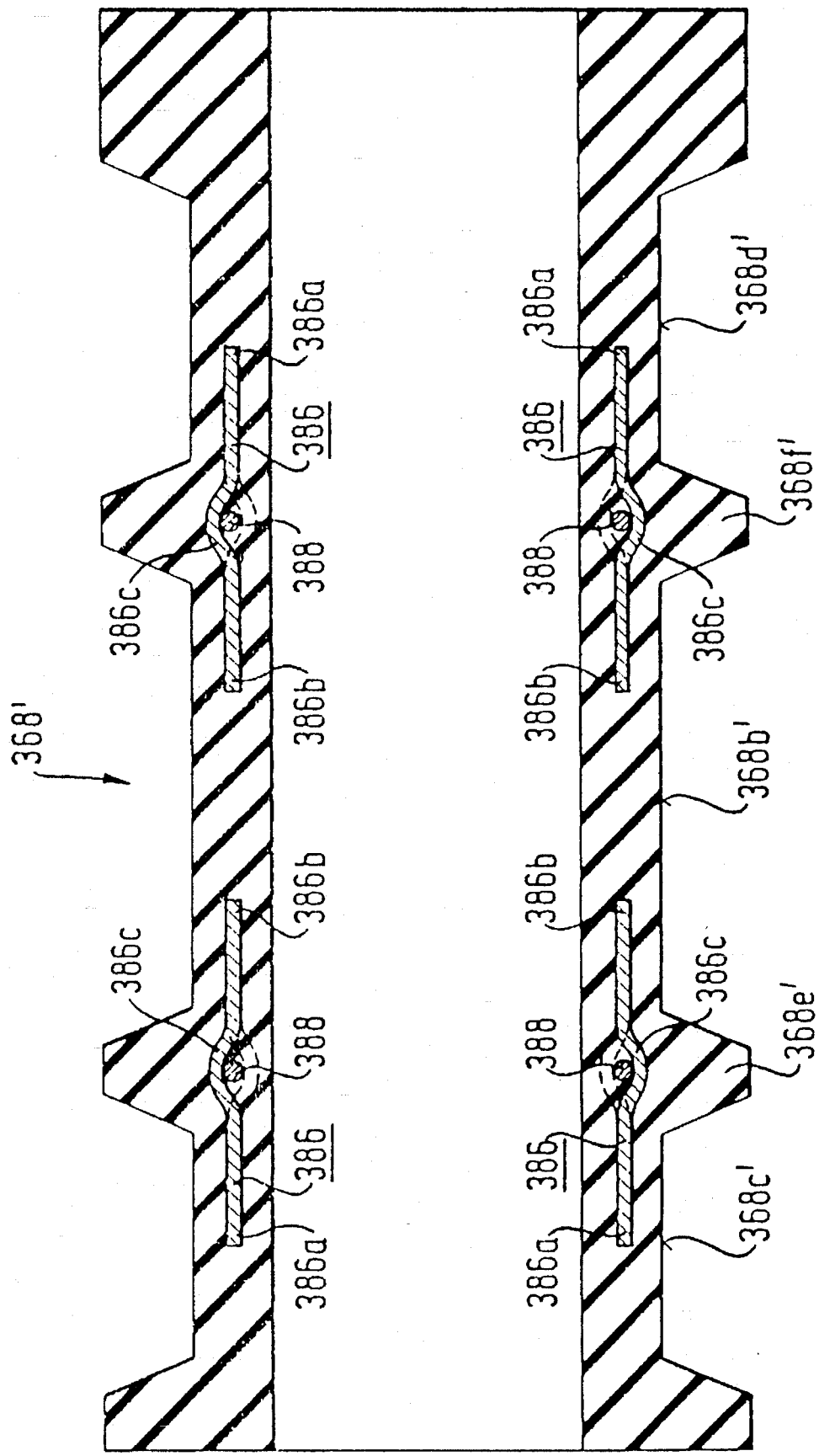

FIG. 8 shows another embodiment of a valve body, by means of which the function described above can be realized in an especially effective manner.

Elongated inlay elements 386 are embedded in valve body 368'; these inlay elements are made, for example, of steel or some other suitably rigid material. One longitudinal end 386a of each inlay element 386 is located in a section of valve body 386' which is assigned to one of the outer ring-shaped grooves 368c', 368d', while the other longitudinal end 386b is located in a section of valve body 386' which is assigned to central ring-shaped groove 368b'.

Figure 9:
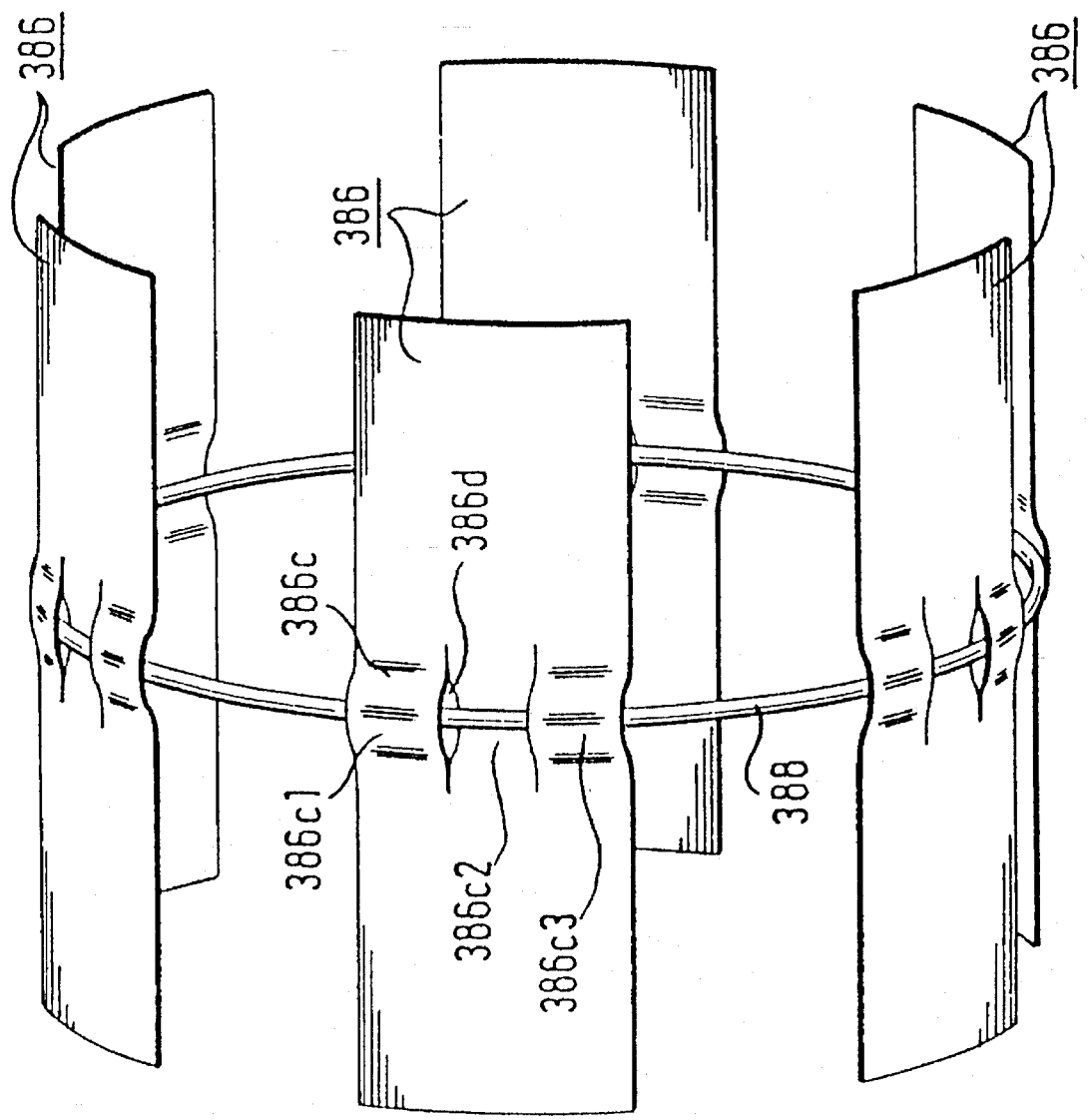

As shown with particular clarity in FIG. 9, inlay elements 386 have, in a middle section 386c, bumps 386c1, 386c2, 386c3, which are pushed up in alternating directions with respect to the normal to the surface of each inlay element 386. Alternating bumps 386c1, 386c2, 386c3 form an access channel 386d, though which a wire hoop 388 is pulled. In the example shown, six inlay elements 386 are lined up in a row on wire hoop 388, but any suitable number of inlay elements desired can be provided. Wire hoops 388 are located near ring-shaped projections 368e', 386f' (see FIG. 8).

When the section of valve body 368' assigned to ring-shaped grooves 368c', 368d' is compressed as a result of a control air pressure applied to chambers 370b, 370c (see FIG. 7), ends 386a of inlay elements 386 pivot inward around wire hoop 388, which serves as the axis of rotation. Because of the rigidity of inlay elements 386, opposite ends 386b of inlay elements 386 swing outward and, therefore, lead to an expansion of the section of valve body 368' assigned to ring-shaped groove 386b'. Thus, a simple and reliable way of ensuring that inlay elements 386 are able to lift valve body 368' up off of valve seat 366c is obtained (see FIG. 7).

As an alternative, it is also possible to lay inlay elements 386 on the inside peripheral surface of valve body 368' rather than to embed them, so that, in the assembled state of switching valve 362, they will be located between valve seat element 366 and valve body 368'.

Spray element 320 according to FIG. 6 also differs from spray element 20 according to FIG. 3 also with respect to the feed lines to the nozzle assembly and the design of the nozzle element.

Feed line 346 for blasting air continues in second housing part 358 in the form of a line 374/374a, which ends at a chamber 376. In an orifice 376a of this chamber 376, a nozzle assembly 380 is installed, the design of which is essentially the same as that of nozzle assembly 80 according to FIG. 3. In contrast to that assembly, however, nozzle assembly 380 has a nozzle element 380d which operates by the external mixing principle, according to which working medium is atomized outside The nozzle element by turbulent compressed air. A section of tubing 378 connected to blind hole 366g of valve seat element 366 serving to supply working medium, therefore, extends all the way to nozzle element 380d, passes through it, and finally ends at an outlet opening 380f.

In the following, the design of nozzle element 380d is explained in detail on the basis of FIG. 10.

In a ball joint 380d1 of nozzle element 380d, a recess 390 is made on the side of nozzle element 380d opposite outlet 380f. On its outlet end, nozzle element 380d has a turbulence chamber 392, into which tube 378 opens. Recess 390 and turbulence chamber 392 are connected to each other by way of longitudinal bores 394. Tube 378 is inserted through a central longitudinal bore 398 of nozzle element 380d and is held in position there by friction. In addition or alternatively thereto, it is possible to provide a stud screw (not shown) in nozzle element 380d to fasten the tube in place. To make it possible for nozzle element 380d to pivot, tube 378 is made of a flexible material such as rigid plastic, etc.

As can be seen in FIGS. 6 and 7, recess 390 is connected to compressed air chamber 376. Compressed air arriving from the chamber passes through bores 394 on its way into turbulence chamber 392. With reference to FIG. 10 again, the compressed air is conducted through bores 394 onto an outlet-side boundary wall 392a of turbulence chamber 392, which serves as a deflector wall to create turbulence in the stream of air. Working medium emerging from tube 378 is atomized by the turbulent compressed air outside outlet 380f to form a spray mist 396.

By means of the embodiment described above in accordance with FIG. 10, it is easy to prepare a pivoting nozzle element which operates according to the external mixing principle. The external mixing principle offers the advantage over the internal mixing principle that, because the working medium is atomized outside opening 380f, it is nearly if not completely impossible for outlet 380f to become clogged.

Nozzle element 380d, furthermore, is distinguished by the small amount of noise which it produces. The reason for this is that, in order to atomize a given amount of working medium by the external mixing principle, a smaller air pressure value is sufficient to reach specified atomization properties than in atomization by the internal mixing principle. According to the internal mixing principle, a mixing chamber must be provided, from which the compressed air emerges at high velocity to atomize the working medium to a sufficient extent and to preserve these atomization properties until after the mist has emerged from the nozzle element. In contrast, the working medium under the external mixing principle is not atomized until after it has emerged from the nozzle orifice, for which purpose a lower velocity is sufficient because of the more intense turbulence of the compressed air at this outlet. Furthermore, because there it no need to overcome any dynamic pressure, the nozzle elements can be designed with larger open cross sections for the passage of the compressed air. Therefore, for a given air throughput, a much lower air pressure value is required to achieve the same quality of atomization, which has a favorable effect on the generation of noise. The use of a deflector wall intensifies the turbulence of the compressed air also, so that, for a given set of atomization properties, the work can be accomplished at an even lower flow velocity and, therefore, at an even lower air pressure, which leads to a further reduction in the amount of noise generated.

The reason for this is that, in a nozzle element operating according to the external mixing principle, there is no need to provide a mixing chamber, and it is therefore possible to accomplish the work with larger open cross sections and correspondingly lower velocities while achieving the same air throughput.

Figure 11:
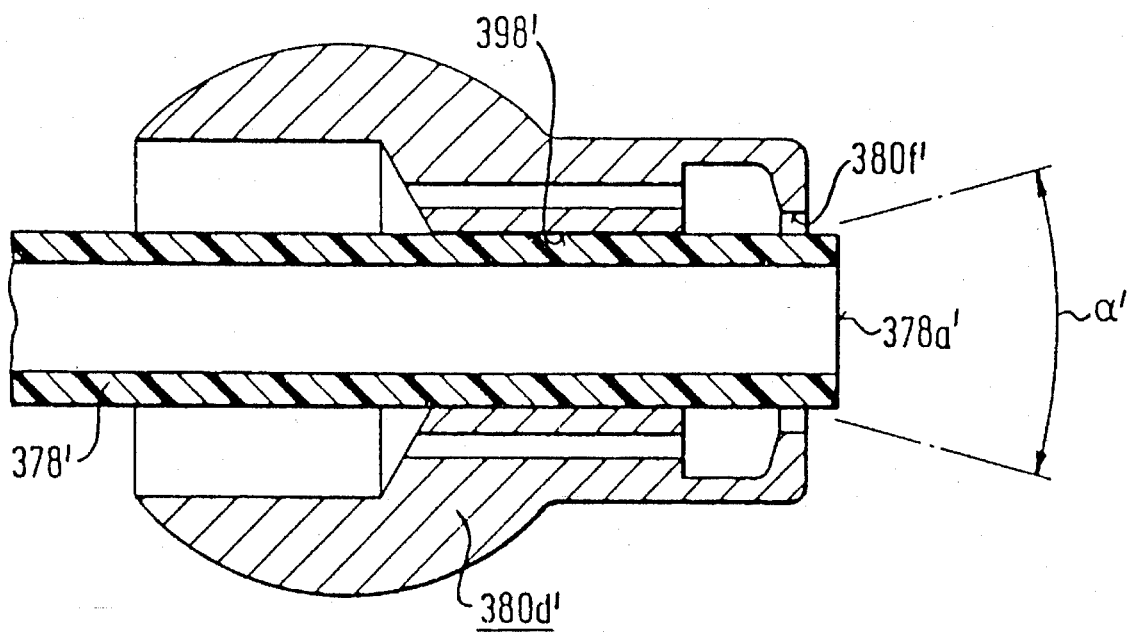

In the case of nozzle element 380d' shown in FIG. 11, tube 378' projects slightly beyond outlet 380f'. Otherwise, nozzle element 380d' is designed in exactly the same way as nozzle element 380d.

Because of the different way in which the orifice 378a, 378a' of tube 378, 378' is positioned relative to outlet 380f, 380f' of nozzle element 380d, 380d', the pattern of the spray produced by spray element 380d' is changed. Starting from the arrangement shown in FIG. 10, with which a spread angle α of the spray mist is obtained, spray angle α' of the spray mist decreases progressively the farther tube 378' projects from central bore 389' of nozzle element 380d'.

Figure 10:
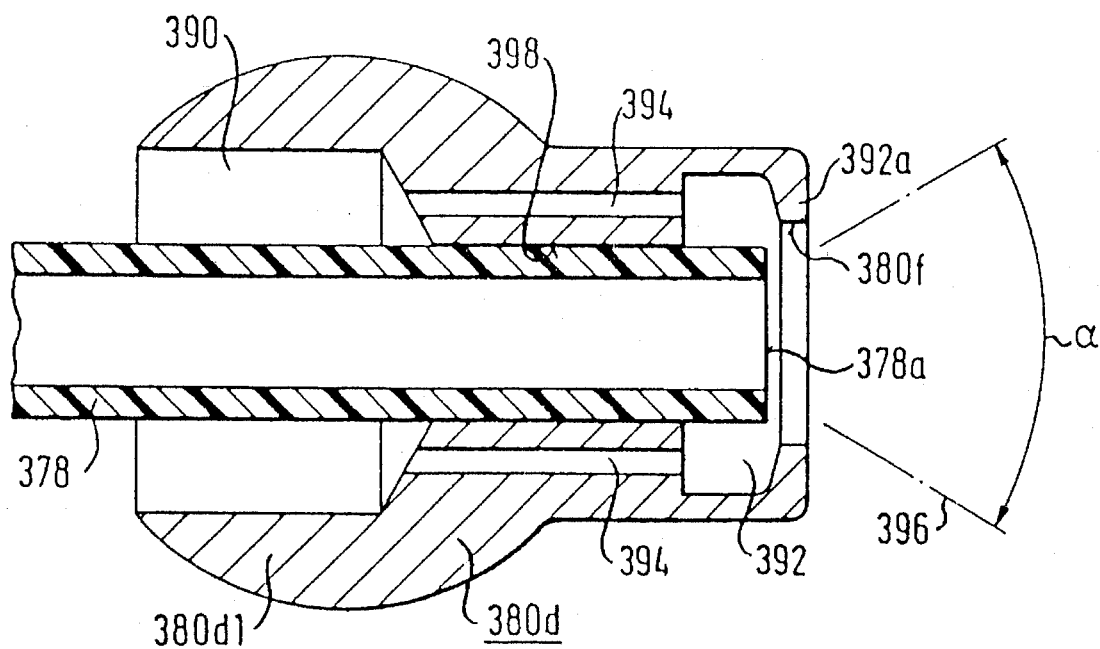

In addition to the advantages already discussed on the basis of FIG. 10, the additional advantage is therefore obtained that the spray pattern of the spray element can be adjusted freely.

Figure 12:
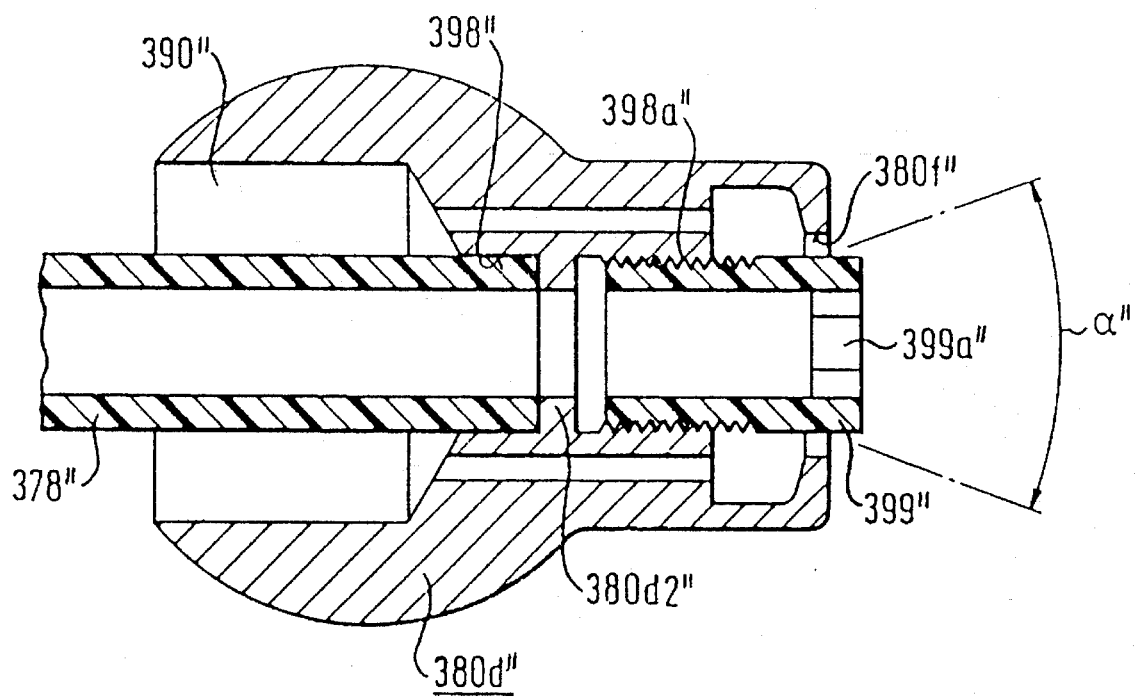

Yet another embodiment of the nozzle element is shown in FIG. 12. In this embodiment, central bore 398" is divided by a ring-shaped flange 380d2"; tube 378" rests against the side of this flange which faces recess 390". On the outlet side, central opening 398" is designed with an internal thread 398a", into which another tube 399" provided with an external thread is screwed. So that tube 399" can be turned, it can be designed, for example, with an internal hexagonal section 399a'. Additional tube 399" can be secured against rotating by a stud screw (not shown), for example, in nozzle element 380d".

Under consideration of the preceding discussion of FIGS. 10 and 11, it is easy to see that, by turning additional tube 399" relative to nozzle element 380d', the spread angle α" of the spray mist can be easily changed as desired.

Although, in the embodiments described above, ring-shaped spaces 66a, 66b, 166a, 166b, 266a, 266b, 366a, and 366b connected to transverse bores 66h, 66i, 166h, 166i, 266h, 266i, 366h, and 366i as well as ring-shaped spaces 366m, 366n are provided and described as being on the outside peripheral surface of the valve seat element, it is also possible in principle to provide these ring-shaped spaces on the inside peripheral surface of the valve body.

We claim:

1. Spray element, especially for die spraying devices, comprising:
   a feed line for fluid working medium and a feed line for control air;
   a feed line for working air connected to an atomizing device connected to the feed line for the working medium; and
   a switching valve, controllable as a function of pressure, with an elastically pretensioned valve body for the optional making or breaking of the connection between the feed line for working medium and the atomizing device, characterized in that the valve body is designed with internal elastic pretension.

2. Spray element according to claim 1, characterized in that the valve body is made of an elastic plastic.

3. Spray element according to claim 1, characterized in that a valve seat element is provided, which, together with the valve body, forms the switching valve.

4. Spray element according to claim 3, characterized in that the valve seat element is produced as an injection-molded part.

5. Spray element according to claim 3, characterized in that, in a first housing part of the spray element, a recess is provided to hold the switching valve.

6. Spray element according to claim 5, characterized in that the feed line for fluid working medium and the feed line for control air are provided in the first housing part.

7. Spray element according to claim 6, characterized in that the atomizing device is connected to a second housing part, which can be attached to and removed from the first housing part.

8. Spray element according to claim 7, characterized in that, in the assembled state of the spray element, the second housing part holds the switching valve in the recess formed in the first housing part.

9. Spray element according to claim 7, characterized in that at least one of the housing parts is made as an injection-molded part.

10. Spray element according to claim 3, characterized in that the valve seat element is designed with cylindrical symmetry and has, on its outside periphery, two ring-shaped recesses separated by a ring-shaped valve seat projection, each of these recesses being bounded in the axial direction of the valve seat element by a ring-shaped support projection for supporting the valve body, each of these recesses also being connected by way of an associated transverse bore to associated blind holes, formed in opposing end surfaces of the valve seat element, where one of the blind holes can be connected to the feed line for working medium, while the other blind hole can be connected to the atomizing device; in that the valve body is designed with cylindrical symmetry and has a central opening extending in the axial direction, which has essentially the same diameter as the ring-shaped support projections of the valve seat element, where the valve body, both in the open and in the closed state of the switching valve, rests with its inside peripheral surface to form a seal against the ring-shaped support projections of the valve seat element; and in that a chamber, which makes it possible for the valve body to rise up off the valve seat element, is provided.

11. Spray element according to claim 10, characterized in that the chamber which makes it possible for the valve body to rise is formed by a ring-shaped recess in the outside peripheral surface of the valve body.

12. Spray element according to claim 11, characterized in that the switching valve is a normally closed valve which is opened by the pressure of the control air.

13. Spray element according to claim 10, characterized in that the ring-shaped support projections have essentially the same outside diameter as the ring-shaped valve seat projection, and in that the chamber which makes it possible for the valve body to rise is connected to the feed line for control air; where, in the open state of the switching valve, a negative control air pressure causes the inside peripheral surface of the valve body to remain a certain distance away from the ring-shaped valve seat projection and, therefore, makes it possible for working medium to pass through; and where, in the closed state of the switching valve, the internal pretension of the valve body causes its own internal peripheral surface to rest against the ring-shaped valve seat projection to form a seal and thus prevents the passage of working medium.

14. Spray element according to claim 10, characterized in that the ring-shaped support projections have a larger outside diameter than the ring-shaped valve seat projection, and in that the chamber which makes it possible for the valve body to rise up is connected to the feed line for control air; where, in the open state of the switching valve, the internal pretension of the valve body causes it to remain a certain distance away from the ring-shaped valve seat projection and, therefore, makes it possible for working medium to flow through; and where, in the closed state of the switching valve, a positive control air pressure causes the inner peripheral surface of the valve body to rest and form a seal against the ring-shaped valve seat projection of the valve seat element and, therefore, prevents the passage of working medium.

15. Spray element according to claim 10, characterized in that the ring-shaped support projections have essentially the same diameter as the ring-shaped valve seat projection, where, in the open state of the switching valve, a positive working medium pressure causes the inner peripheral surface of the valve body to remain a certain distance away from the ring-shaped valve seat projection and, therefore, allows the passage of working medium; and where, in the closed state of the switching valve, the internal pretension of the valve body causes its own inner peripheral surface to rest and form a seal against the ring-shaped valve seat projection and thus prevents the passage of working medium.

16. Spray element according to claim 15, characterized in that the chamber which makes it possible for the valve body to rise is connected by way of a compensating line to the outside environment.

17. Spray element according to claim 3, characterized in that the switching valve is normally an open valve, which is closed by the pressure of the control air.

18. Spray element according to one of claim 1, characterized in that the switching valve is a normally closed valve, which is opened by the pressure of the working medium.

19. Spray element according to claim 1, characterized in that a pressure monitoring device is installed in the feed line for control air.

20. Spray element, especially for die spraying devices, comprising:
   a feed line for fluid working medium and a feed line for control air;
   an atomizing device connected to the feed line for the working medium; and
   a switching valve controllable as a function of pressure, with an elastically pretensioned valve body for the optional making or breaking of the connection between the feed line for working medium and the atomizing device, characterized in that the valve body is designed with internal elastic pretension;

a valve seat element is provided, which, together with the valve body, forms the switching valve;

a first housing part of the spray element, a recess is provided to hold the switching valve;

the feed line for fluid working medium and the feed line for control air are provided in the first housing part:

the atomizing device is connected to a second housing part, which can be attached to and removed from the first housing part:

the spray element also has a feed line for working air connected to the atomizing device, the atomizing device being designed to atomize the working medium by means of working air.

21. Spray element according to claim 20, characterized in that a first section of the feed line for working air is provided in the first housing part, and in that a second section of the feed line for working air is provided in the second housing part.

22. Spray element according to claim 21, characterized in that the atomizing device is designed to be connected to a nozzle assembly.

23. Spray element, especially for die spraying devices, comprising:

a feed line for fluid working medium and a feed line for control air;

an atomizing device connected to the feed line for the working medium; and a switching valve, controllable as a function of pressure, with an elastically pretensioned valve body for the optional making or breaking of the connection between the feed line for working medium and the atomizing device, characterized in that the valve body is designed with internal elastic pretension;

a valve seat element which, together with the valve body, forms the switching valve;

said valve seat element is designed with cylindrical symmetry and has, on its outside periphery, two ring-shaped recesses separated by a ring-shaped valve seat projection, each of these recesses being bounded in the axial direction of the valve seat element by a ring-shaped support projection for supporting the valve body, each of these recesses also being connected by way of an associated transverse bore to associated blind holes, formed in opposing end surfaces of the valve seat element, where one of the blind holes can be connected to the feed line for working medium, while the other blind hole can be connected to the atomizing device; in that the valve body is designed with cylindrical symmetry and has a central opening extending in the axial direction, which has essentially the same diameter as the ring-shaped support projections of the valve seat element, where the valve body, both in the open and in the closed state of the switching valve, rests with its inside peripheral surface to form a seal against the ring-shaped support projections of the valve seat element; and in that a chamber, which makes it possible for the valve body to rise up off the valve seat element and which possibly can be connected to the feed line for control air, is provided;

the valve seat element has two additional ring-shaped recesses adjacent to the two ring-shaped support projections, each of these additional recesses being bounded in the area of the associated axial end of the valve seat element by an additional ring-shaped projection, where both the additional ring-shaped projections and the ring-shaped support projections have essentially the same outside diameter as the ring-shaped valve seat projection; in that, in the area of the additional ring-shaped recesses of the valve seat element, two control chambers are provided, between which the chamber is situated, which makes it possible for the valve body to rise; where, in the open state of the switching valve, a positive control air pressure in the control chambers lifts the inside peripheral surface of the valve body near the chamber off the ring-shaped valve seat projection and, therefore, allows passage of working medium; and where, in the closed state of the switching valve, the internal pretension of the valve body causes its own inner peripheral surface to rest and form a seal against the ring-shaped valve seat projection and thus prevents the passage of working medium.

24. Spray element according to claim 23, characterized in that essentially rigid inlay elements are embedded in the valve body, each of these elements extending from control chamber sections of the valve body associated with the control chambers to an intermediate section of the valve body, which is associated with the chamber which makes it possible for the valve body to rise; and where a deflection of the inlay elements resulting from a compression of the control chamber sections under the action of positive control air pressure is transferred to the intermediate section and here leads to an expansion of the valve body, which lifts the valve body up off the valve seat.

\* \* \* \* \*

UNITED STATES PATENT AND TRADEMARK OFFICE
CERTIFICATE OF CORRECTION

Figure 4:
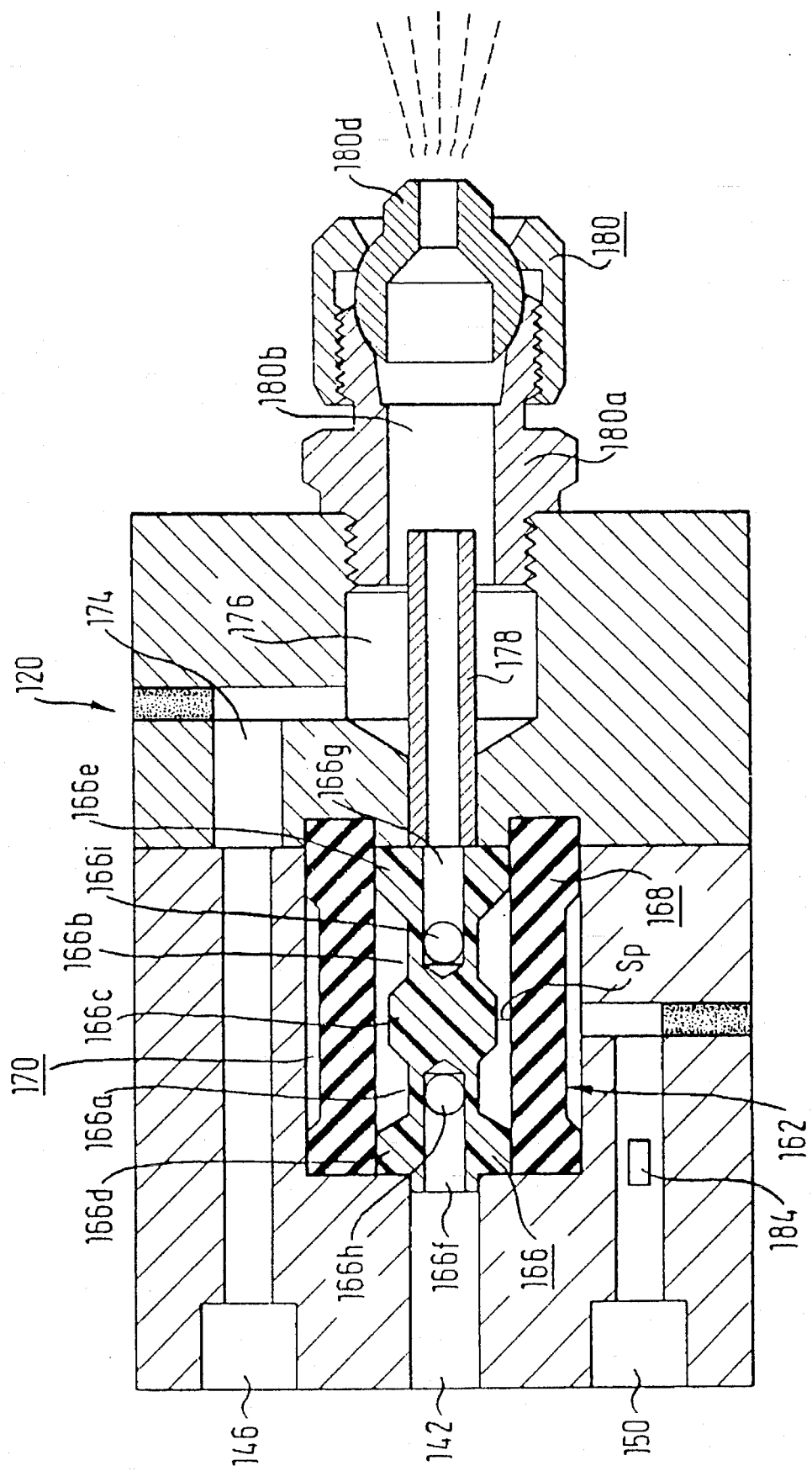

PATENT NO. : 5,524,829
DATED : June 11, 1996
INVENTOR(S) : Karl-Heinz Keim, Rudi Kober and Hans-Dieter Renkl It is certified that error appears in the above-indentified patent and that said Letters Patent is hereby corrected as shown below:

Column 1, Line 39, "The" should read -- the --.
Column 1, Line 43, "The" should read -- the --.
Column 7, Line 1, after "unit", insert -- 14b --.
Column 7, Line 5, after "arrow", insert -- B --.
Column 8, Line 18, "564c" should read -- 54c --.
Column 8, Line 20, after "medium", delete ":", insert -- ; --.
Column 8, Line 49, after "plug", insert -- 64. --.
Column 9, Line 45, "80h" should read -- 80b --.
Column 10, Line 25, "FIG. 3" should read -- FIG. 4 --.
Column 11, Line 47, "The" should read -- the --.
Column 13, Line 31, "The" should read -- the --.

Signed and Sealed this

Twenty-second Day of April, 1997

*Attest:*

BRUCE LEHMAN

*Commissioner of Patents and Trademarks*

*Attesting Officer*